UNITED STATES PATENT OFFICE.

EMIL FISCHER, OF BERLIN, GERMANY, ASSIGNOR TO C. F. BOEHRINGER & SOEHNE, OF WALDHOF, GERMANY.

PROCESS OF OBTAINING XANTHIN DERIVATIVES.

SPECIFICATION forming part of Letters Patent No. 588,327, dated August 17, 1897.

Application filed June 16, 1896. Serial No. 595,792. (No specimens.)

*To all whom it may concern:*

Be it known that I, EMIL FISCHER, a citizen of Germany, residing at Berlin, Germany, have invented certain new and useful Improvements in the Art of Obtaining Derivatives of Xanthin; and I do hereby declare the following to be a full, clear, and exact description of the invention, such as will enable others skilled in the art to which it appertains to make and use the same.

The present invention relates to the art of obtaining derivatives of xanthin, and more particularly the halogen alkyl derivatives and the alkyl derivatives obtained from them—such, for example, as chlorocaffein and caffein or trimethyl xanthin. In my Patents Nos. 469,489 and 469,490, both dated October 13, 1896, I have described and claimed the method of obtaining such derivatives from dialkyl-uric acid by treating the same with halogen compounds of phosphorus and reducing the resulting halogen dialkyl derivative of xanthin, whereby a dialkyl derivative of xanthin is obtained, or first alkylizing a salt of the halogen dialkyl derivative of xanthin and then reducing the resulting halogen trialkyl derivative into the corresponding trialkyl derivative of xanthin. As the result of further experiments and investigations in this field I have found that such alkyl derivatives may be obtained also from the tetraalkyl derivatives of uric acid, and my present invention, which is based on this discovery, has been reduced to practice in the manner which will be hereinafter set forth.

The said invention consists, essentially, in the treatment of the tetraälkyl derivatives of uric acid with chlorin compounds of phosphorus, and such further features, steps, and methods, as will be hereinafter described, and pointed out in the claims.

As an exemplification of my invention chlorocaffein may be obtained from tetramethyl-uric acid by heating the latter with phosphorus oxychlorid. Assuming that the methyl of the tetramethyl derivative is to be employed for the production of a compound ether or ester of phosphoric acid, this process may be represented in the following equation:

Tetramethyl-uric acid. Chlorocaffein.

or

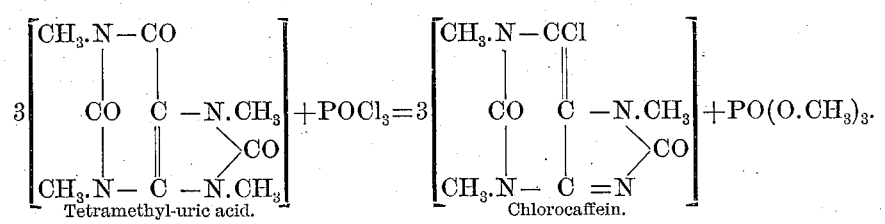

The tetramethyl derivative employed in this process may be obtained from uric acid by the method described and claimed in my Letters Patent of the United States No. 571,352, dated November 17, 1896, or by any other method. The same process is employed to obtain other trialkyl derivatives of xanthin.

To return to the above example, I will now describe the process in detail. I take dry tetramethyl-uric acid and heat the same for ten hours with five times its weight of phosphorus oxychlorid in a closed vessel, the heat of the mixture being maintained at from 160° to 165° centigrade. A clear liquid having a pale brown color results, from which crystals separate on cooling. On evaporating a slightly-colored residue remains, which is changed to a crystalline powder when treated with water. The unchanged tetramethyl-uric acid may be recovered from the aqueous mother liquor by evaporating and then neutralizing with bases and finally dissolving with chloroform. The portion which is insoluble in water is a mixture of chlorocaffein with a compound richer in chlorin. The chlorocaffein is purified from this latter compound by repeatedly dissolving in and crystallizing out of hot alcohol. The compound richer in chlorin will then remain in the mother liquor.

The chlorocaffein may be purified still more readily in the following manner: The crude product is heated with fuming hydrochloric acid and maintained at a temperature of 130° centigrade for three hours. The solution is then evaporated to dryness and the residue extracted with cold dilute soda-lye. Under this treatment the chlorocaffein remains, while the impurities, which by the preceding treatment have been converted into acids, are dissolved out by the alkali. A single recrystallization out of hot alcohol is now sufficient to completely purify the chlorocaffein.

The temperature above set forth, while preferable, is not absolutely necessary for obtaining the chlorocaffein from tetramethyl-uric acid. This conversion already takes place at a temperature of from 145° to 150° centigrade, but proceeds less rapidly than at the higher temperature.

In lieu of phosphorus oxychlorid other chlorin compounds of phosphorus, such as phosphorus trichlorid, may be employed; but according to my experience the process will then be less perfect, the yield in chlorocaffein being lower and the crude product more difficult to purify.

The chlorocaffein may be converted into caffein in the well-known manner of treating the former with nascent hydrogen or other reducing agent.

In the same manner as the tetramethyl-uric acid other tetraälkyl derivatives may be treated under the above-described process, the process then resulting in the corresponding alkyl derivatives of xanthin.

What I claim, and desire to secure by Letters Patent, is—

1. The process which consists in treating a tetraälkyl-uric acid with a halogen compound of phosphorus for the purpose of converting the same into a halogen derivative of alkylized xanthin.

2. The process which consists in treating a tetraälkyl-uric acid with a phosphorus oxyhalogen compound, for the purpose of converting the same into a halogen derivative of alkylized xanthin.

3. The process which consists in heating tetramethyl-uric acid with phosphorus oxychlorid in the proportions and to the temperature, substantially as set forth.

4. The process which consists in heating tetramethyl-uric acid with five times its weight of phosphorus oxychlorid in a closed vessel to from 160° to 165° centigrade, and maintaining this temperature for ten hours, substantially as set forth.

5. The process which consists in acting on a tetraälkyl-uric acid with a halogen phosphorus compound, and then purifying the crude product by subjecting the same to the action of fuming hydrochloric acid, evaporating the resulting solution to dryness and treating the residue with soda-lye, substantially as set forth.

6. The process which consists in acting on tetramethyl-uric acid with phosphorus oxychlorid in the proportions and at the temperature and for the time, substantially as set forth, then separating the crude product and acting on the same with fuming hydrochloric acid in the proportions and at the temperature and for the time, substantially as set forth, then evaporating the resulting solution to dryness and extracting the residue with soda-lye, substantially as set forth.

7. The process which consists in acting upon a tetraälkyl-uric acid with a phosphorus halogen compound, then separating out the resulting halogen derivative of alkylized xanthin, and finally acting upon the latter by reducing agents whereby the halogen derivative is converted into the corresponding alkyl derivative of xanthin.

8. The process which consists in acting upon tetramethyl-uric acid with a phosphorus chlorin compound, and then separating out the resulting chlorocaffein and, finally, acting upon the latter with reducing agents to obtain caffein.

In testimony whereof I affix my signature in presence of two witnesses.

EMIL FISCHER.

Witnesses:
 WM. HAUPT,
 G. PINKUS.